United States Patent Office 3,518,230
Patented June 30, 1970

3,518,230
IMIDE MODIFIED AMIDE IMIDE WIRE ENAMEL
Howard E. Sheffer, Burnt Hills, and Gerald C. Zielinski, Schenectady, N.Y., assignors to Schenectady Chemicals, Inc., Schenectady, N.Y., a corporation of New York
No Drawing. Filed Jan. 4, 1968, Ser. No. 695,579
Int. Cl. C08g 20/32
U.S. Cl. 260—65
11 Claims

ABSTRACT OF THE DISCLOSURE

Polyamide-imides are prepared by either (1) reacting 1 mole of trimellitic anhydride with 0.5 mole of a diamine to form diimide-dibasic acid and then reacting this product with 0.5 mole of a diisocyanate or (2) reacting 1 mole of diisocyanate with 1 mole of a mixture of trimellitic anhydride and an aromatic dianhydride containing up to 25 mole percent of the dianhydride. The products are formulated into wire enamels and are coated on electrical conductors.

The present invention relates to the preparation of polyamide-imides.

It is known to prepare wire enamels from polyamide-imides prepared by reacting trimellitic anhydride mono acid chloride with an aromatic diamine, e.g. methylene dianiline, e.g. see Belgian Pat. 650,979, Stephens U.S. Pat. 3,347,828, Loncrini U.S. Pat. 3,355,427 and Lavin U.S. Pat. 3,260,691. However, the products thus obtained do not give as smooth a film on electrical conductors, e.g. copper wire, as desired. In addition the polymer present in the enamel contains unconverted amic acid groups in addition to the imide and amide linkages. The Belgian patent points out in Examples 5 to 7 that if the trimellitic anhydride mono acid chloride is replaced by trimellitic anhydride the resulting product gives a brittle film which is unsuitable for use as a coating.

It is an object of the present invention to prepare novel amide-imide polymers.

Another object is to prepare an electrical conductor coated with such a polymer and having improved properties.

A further object is to prepare a more ordered polymer than is obtainable using prior art procedures as set forth supra or in using the procedure of Sheffer application Ser. No. 675,020 filed Oct. 13, 1967.

Yet another object is to prepare a more branched polyamide-imide.

Still further objects and the entire scope of applicability of the present invention will become apparent from the detailed description given hereinafter; it should be understood, however, that the detailed description and specific examples, while indicating preferred embodiments of this invention, are given by way of illustration only, since various changes and modifications within the spirit and scope of the invention will become apparent to those skilled in the art from this detailed description.

It has now been found that these objects can be attained by either (1) reacting 1 mole of trimellitic anhydride 0.5 mole of an aromatic diamine and then reacting this product with 0.5 mole of an aromatic diisocyanate or (2) reacting 1 mole of an aromatic diisocyanate with 1 mole of a mixture of trimellitic anhydride and an aromatic dianhydride containing 5 to 25 mole percent of the dianhydride. Both types of products are useful in forming wire enamels for coating electrical conductors.

In reaction (1) above the trimellitic anhydride and the diamine react to form a diimide-dibasic acid having the formula:

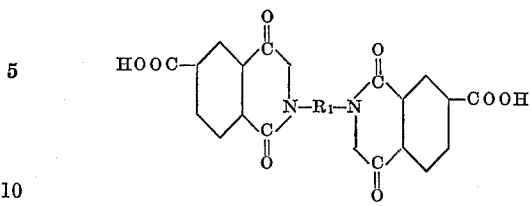

where $R_1$ is the divalent residue of the aromatic diamine. This compound is then reacted with the diisocyanate in an amount of 0.9 to 1.0 moles of diisocyanate to the diimide dibasic acid. If 1.1 mole of diisocyanate is used per mole of the dibasic acid no storage stability of the wire enamel is possible and the viscosity of the product advances rapidly, eventually gelling.

Similarly in reaction (2) above the diisocyanate should be 0.9 to 1.0 mole of total trimellitic anhydride and dianhydride.

To retard increases in viscosity on standing due to the presence of unreacted isocyanate groups there can be added to the wire enamel blocking agents such as phenols, e.g. phenol per se, acrylic acid, m,p-cresol, p-cresol, O-cresol, xylenol or the like.

As the aromatic diisocyanates there is preferably employed 4,4'-diisocyanatodiphenyl methane. Other aromatic diisocyanates which can be used include toluene diisocyanate (either the 2,4-isomer, the 2,6-isomer or mixtures of such isomers), 4,4'-bi-o-tolylene diisocyanate (Isocyanate 136T) 4,4' - methylene - di - o - tolylisocyanate (Hylene DDM), m-phenylene diisocyanate, 4-methoxy-1,3-phenylene diisocyanate, 4-chloro-1,3-phenylene diisocyanate, 4-isopropyl-1,3-phenylene diisocyanate, 2,4'-diisocyanato-diphenyl ether, 4,4'-diisocyanatodiphenyl ether, 3,3'-dimethyl-4,4'-diisocyanatodiphenyl methane, mesitylene diisocyanate, durylene diisocyanate, 3,3'-bitolylene-4,4'-diisocyanate, 1,5-naphthalene diisocyanate, 4,4'-diisocyanatodiphenyl sulfone.

As the aromatic diamine there can be employed methylene dianiline (4,4'-diaminophenyl methane), oxydianiline (4,4'-diaminophenyl ether), benzidine, p-phenylene diamine, 3,3'-diaminodiphenyl, 1,4-diamino naphthalene, 4,4-diaminodiphenyl ketone, 4,4'-diamino-diphenyl sulfone, bis-(4-aminophenyl)-d,d'-p-xylene diamine.

As the dianhydride there can be used pyromellitic dianhydride, benzophenone dianhydride, naphthalene 2,3,6,7 dianhydride, naphthalene 1,2,5,6 dianhydride, diphenyl, 2,3,2',3'-dianhydride, the dianhydride of 2,2-bis (3',4'-dicarboxyphenyl) propane, the dianhydride of bis (3,4-dicarboxyphenyl) sulfone, perylene 3,4,9,10-dianhydride. It will be understood that all of the dianhydrides referred to above are dicarboxylic anhydrides.

The polyamide-imide forming reaction is normally carried out in the presence of the same solvents used to form the wire enamel. Thus there can be used N-methyl pyrrolidone, dimethyl acetamide, dimethyl formamide, dimethyl sulfoxide, N-methyl caprolactan, cresylic acid, p-cresol, m-p-cresol mixture, dimethyl sulfone, phenol. Mixtures of solvents can be used, e.g. blends of N-methyl pyrrolidone with dimethyl acetamide and/or dimethyl formamide, a mixture of N-methyl pyrrolidone, dimethyl acetamide and toluene (6:3:4); a mixture of N-methyl pyrrolidone and xylene; a mixture of phenol, cresylic acid and Solvesso 100.

Both aliphatic and aromatic hydrocarbons can be used as diluents, e.g. aromatic naphthas such as Solvesso 100, toluene, xylene, and aliphatic hydrocarbons such as octane, decane, dodecane and tetradecane.

Preferably the reaction is carried out in a single solvent such as N-methyl pyrrolidone since this gives a more branched amide-imide than is obtained when the solvent is diluted, e.g. with Solvesso 100 in preparing the polymer. The finished branched polymer thus prepared tolerates much more Solvesso 100 and similar diluents than does a relatively unbranched polymer made in the presence of Solvesso 100 as a diluent for the solvent.

The polyamide-polyimides both of reactions (1) and (2) are employed as wire enamels while in solution in a solvent system such as those specified above. It is applied to an electrical conductor, e.g. copper, silver, aluminum or stainless steel wire in conventional fashion, e.g. by the "free dip" method or the "die application" procedure both of which procedures are described in Meyer Pat. 3,201,276. Wire speeds of 15 to 36 feet per minute can be used with wire tower temperatures of 250 to 800° F., usually with a final temperature of above 500° F. The build-up of the polyamide-imide enamel on the wire can be 0.005 to 0.010 inch, preferably 0.002 to 0.004 inch using No. 18 wire. The wire is passed through the enamel one or more times until the desired build-up is obtained. (The build-up is the total increase in diameter over the bare wire diameter.)

Unless otherwise indicated all parts and percentages are by weight.

The polymer prepared by reaction procedure (1) supra is a very ordered amide-imide in which two imides groups are followed by two amide groups and this is repeated throughout the polymer. One difference between the random imide-amide of the Sheffer application referred to supra and the ordered amide-imide of the present invention is that the present product tolerates less Solvesso 100 in a mixture with N-methyl pyrrolidone.

In reaction (1) supra the order of reaction obviously is critical. For example only a very low viscosity product is obtained if 1.0 mole trimellitic anhydride is reacted first with 0.5 mole of 4,4'-diisocyanatodiphenyl methane (Multrathane M) followed by addition of 0.5 mole of methylene dianiline.

In reaction (1) heating of the trimellitic anhydride and diamine should be continued until the triimide dibasic acid is formed since only a low viscosity product is obtained if the initial reaction goes only to the extent of forming the amic acid.

EXAMPLE I 79 grams (0.4 mole) of methylene dianiline, 154 grams 10.8 mole of trimellitic anhydride and 770 grams of N-methyl pyrrolidine were heated to 380° F. in a container equipped with a Dean-Stark tube. The Dean-Stark tube contained enough xylene to azeotrope the water formed in the reaction. The batch in the container was heated at 380° F. for 40 minutes to take off the water. There the batch was cooled to room temperature and 101 grams (0.4 mole) of 4,4'-diisocyanatodiphenyl methane (Multrathane M) were added and the temperature was increased to 300° F. slowly over a period of 3 hours to give a wire enamel having a final viscosity of V. Gardner-Holdt at 27.8% solids, yield 988 grams. The enamel was used to coat No. 18 copper wire by the free dip method.

EXAMPLE II 79 grams (0.4 mole) of methylene dianiline, 154 grams (0.8 mole) of trimellitic anhydride, 668.5 grams of N-methyl pyrrolidone and 101.5 grams of Solvesso 100 (aromatic naphtha) were heated to 370° F. in a container equipped with a Dean-Stark tube containing xylene. The heating at 370° F. was continued for 2 hours until no more water came off as an azeotrope with the xylene. Then 101 grams (0.4 mole) of Multrathane M were added at 120° F. After heating for 15 minutes at 240° F. and allowing the batch to stand at room temperature for 16 hours the reaction mixture was very viscous. Further heating for 1.5 hours at 240° F. gave a batch that had a Z7 viscosity (Gardner-Holdt) and was slightly cloudy. Addition of 580 grams of N-methyl pyrrolidone gave a clear wire enamel having a viscosity of X at 18% solids. The lower solubility of the polymer prepared in Example II than that prepared in Example I was due to the use of a mixed solvent of N-methyl pyrrolidone and Solvesso 100 which resulted in a less branched amide-imide being formed. When using only a single solvent, N-methyl pyrrolidone, as in Example I a more branched amide-imide polymer is obtained which tolerates the addition of much more Solvesso 100 as a diluent.

EXAMPLE III 79 grams of methylene dianiline, 154 grams of trimellitic anhydride and 715 grams of N-methyl pyrrolidone were heated in a container equipped with a Dean-Stark tube containing xylene. The heating was carried out at 390° F. for 1 hour until no more water came off as an azeotrope with the xylene then 101 grams of Multrathane M were added at 120° F. After heating for 20 minutes at 240° F. and allowing the batch to stand for 16 hours at room temperature the reaction mixture was very viscous. Further heating for 2 hours at 260° F. gave a batch that had a Z viscosity with an 85% check cut in N-methyl pyrrolidone and a Y viscosity with an 85% check cut in Solvesso 100. The batch itself was at 30% solids. Addition of 100 grams of Solvesso 100 gave a wire enamel having a Z1 viscosity (Gardner-Holdt) at 27% solids, yield 933 grams.

EXAMPLE IV 108 grams (0.56 mole) of trimellitic anhyride, 188 grams (0.75 mole) of Multrathane M, 60.5 grams (0.19 mole) of 3,4,3',4'-benzophenone dicarboxylic anhydride, 824 grams of N-methyl pyrrolidone of 273 grams of enamel wire naphtha were heated for 12 hours at 300–320° F. The viscosity was Z5–Z6. After addition of 204 grams of the N-methyl pyrrolidone and 69 grams of the EW naphtha the viscosity of the resulting wire enamel was Z1 at 20.5% solids, yield 1190 grams. The enamel was used to coat No. 18 copper wire by the free dip method.

It will be observed that in Example IV the dianhydride is 25.33% of the total trimellitic anhydride and dianhydride.

It will be realized the wires coated with the polyamide-imides of the present invention can receive a topcoat with any of the conventional polymers such as linear polyimides, e.g. a polyiimide prepared from equimolar parts of pyromellitic dianhydride and oxydianiline, or polyesters, e.g. polyethylene terephthalate (Dacron), etc.

What is claimed is:

1. A polyamide-imide prepared by heating in a solvent (a) 1 mole of a mixture of trimellitic anhydride and from 5 to 25.3 mole percent of an aromatic dianhydride based on the total of trimellitic anhydride and dianhydride, said dianhydride being selected from the group consisting of pyromellitic dianhydride, benzophenone dianhydride, naphthalene dianhydride, the dianhydride of 2,2-bis(3',4'-dicarboxyphenol) propane, diphenyl 2,3,2', 3'-dianhydride, the dianhydride of bis (3,4-dicarboxyphenyl) sulfone and perylene 3,4,9,10-dianhydride, with (b) 0.9 to 1.0 mole of an aromatic diisocyanate.

2. A polyamide-imide according to claim 1 wherein the aromatic dianhydride is selected from the group consisting of pyromellitic dianhydride, naphthalene 2,3,6,7-dianhydride, naphthalene 1,2,5,6-dianhydride, diphenyl 2,3,2',3'-dianhydride, the dianhydride of bis(3',4'-dicarboxyphenyl) propane, the dianhydride of bis (3,4-dicarboxyphenyl) sulfone and perylene 3,4,9,10-dianhydride.

3. A wire enamel composition containing the product of claim 2 in a solvent.

4. A wire enamel composition consisting essentially of the product of claim 3 in a solvent.

5. A polyamide-imide according to claim 1 prepared by heating at 300–320° F., 108 grams of trimellitic anhydride, 188 grams of 4,4'-diisocyanatodiphenyl methane and 60.5 grams of 3,4,3',4'-benzophenone dicarboxylic anhydride.

6. A wire enamel composition containing the product of claim 1 in a solvent.

7. A product according to claim 1 wherein the dianhydride is benzophenone dianhydride or pyromellitic dianhydride.

8. A product according to claim 7 wherein the diisocyanate is 4,4'-diisocyanatodiphenyl methane.

9. A product according to claim 8 wherein the mole ratio of total anhydrides to diisocyanate is 1 to 1.

10. A product according to claim 9 wherein the dianhydride is benzophenone dianhydride.

11. A product according to claim 10 wherein the mole ratio of trimellitic anhydride to benzophene dianhydride is 3:1.

References Cited

UNITED STATES PATENTS

| | | | |
|---|---|---|---|
| 3,260,691 | 7/1966 | Lavin et al. | 260—30.2 |
| 3,314,923 | 4/1967 | Muller et al. | 260—78 |
| 3,347,828 | 11/1967 | Stephens et al. | 260—47 |
| 3,300,420 | 1/1967 | Frey | 260—2.5 |
| 3,314,923 | 4/1967 | Muller et al. | 260—78 |

WILLIAM H. SHORT, Primary Examiner

L. L. LEE, Assistant Examiner

U.S. Cl. X.R.

117—128.4, 132, 161; 260—30.2, 30.8, 32.4, 32.6, 33.4, 33.6, 77.5, 78